United States Patent [19]
Kanehl

[11] Patent Number: 5,953,999
[45] Date of Patent: Sep. 21, 1999

[54] REMOVABLE TRAY ASSEMBLY FOR A VEHICLE

[76] Inventor: Donald Kanehl, 240 Hewlett Ave., East Patchogue, N.Y. 11772

[21] Appl. No.: 09/040,051

[22] Filed: Mar. 17, 1998

[51] Int. Cl.[6] .................................................. A47B 23/00
[52] U.S. Cl. ............................................................ 108/44
[58] Field of Search ...................... 100/44, 45, 25, 100/46, 26, 152; 108/157.13, 157.1

[56] References Cited

U.S. PATENT DOCUMENTS

| | | | |
|---|---|---|---|
| 1,921,463 | 8/1933 | Graham | 108/46 |
| 2,672,988 | 3/1954 | Johnson | 108/46 X |
| 2,768,043 | 10/1956 | Kristoff et al. | 108/46 |
| 3,037,639 | 6/1962 | Kost | 108/46 X |
| 4,203,373 | 5/1980 | Conti | 108/152 |
| 4,792,163 | 12/1988 | Kulle | 108/44 X |
| 5,370,060 | 12/1994 | Wang | 108/44 |
| 5,511,493 | 4/1996 | Kanehl, Jr. | 108/44 |

Primary Examiner—Jose V. Chen
Attorney, Agent, or Firm—Galgano & Burke

[57] ABSTRACT

A removable tray assembly for a vehicle includes a tray, and a mounting assembly having a mounting bracket which is removably supportable on a vehicle and a single-slide releasable locking mechanism which slideably supports and releasably locks the tray on the mounting bracket. The single-slide mechanism of the tray assembly also includes a moveable resilient tongue-like pawl which operates to releasably lock the tray at a desired vertical position relative to the mounting bracket.

19 Claims, 9 Drawing Sheets

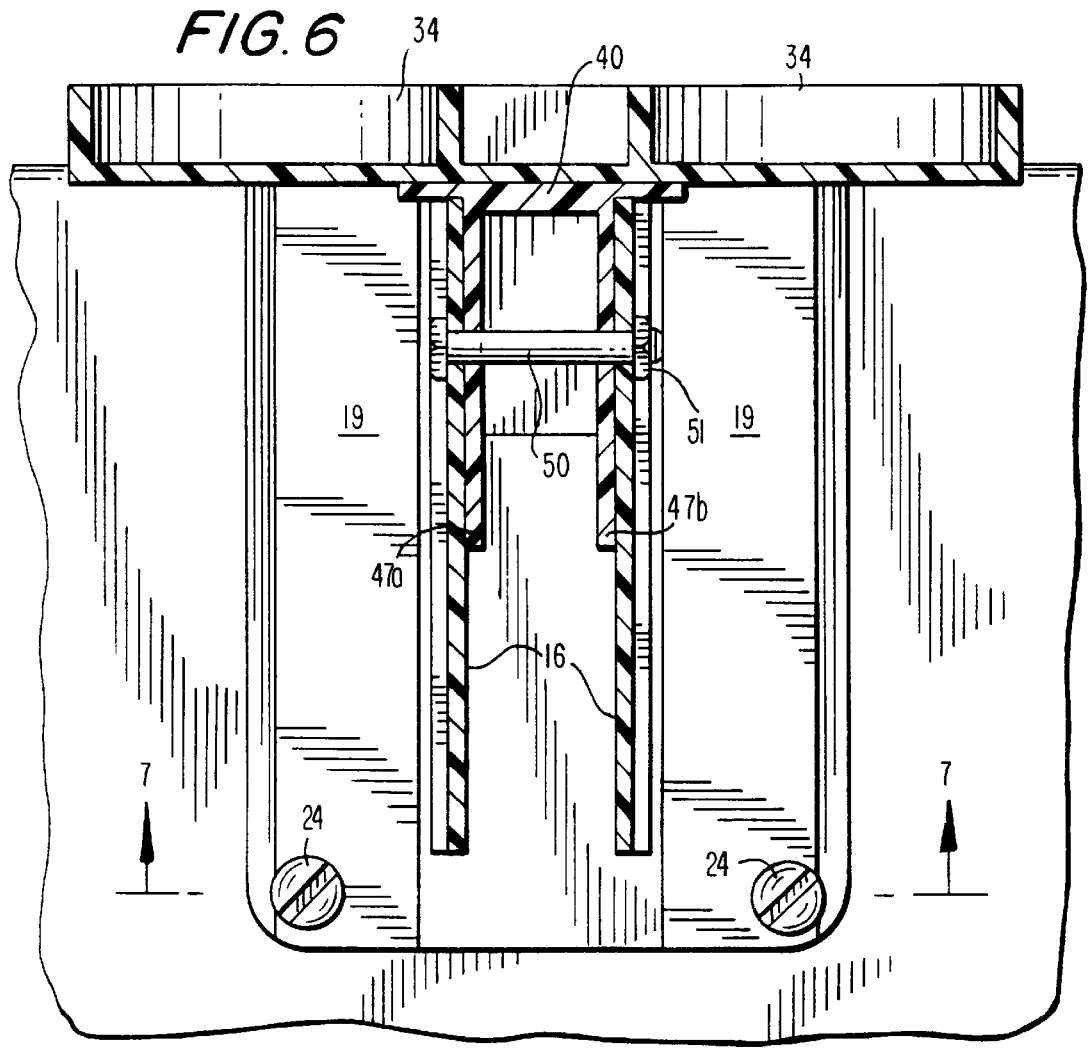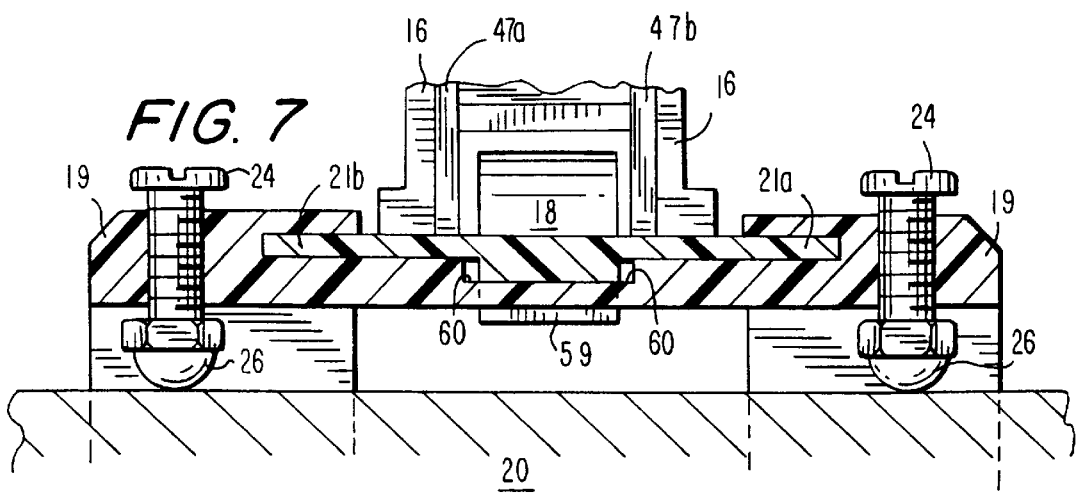

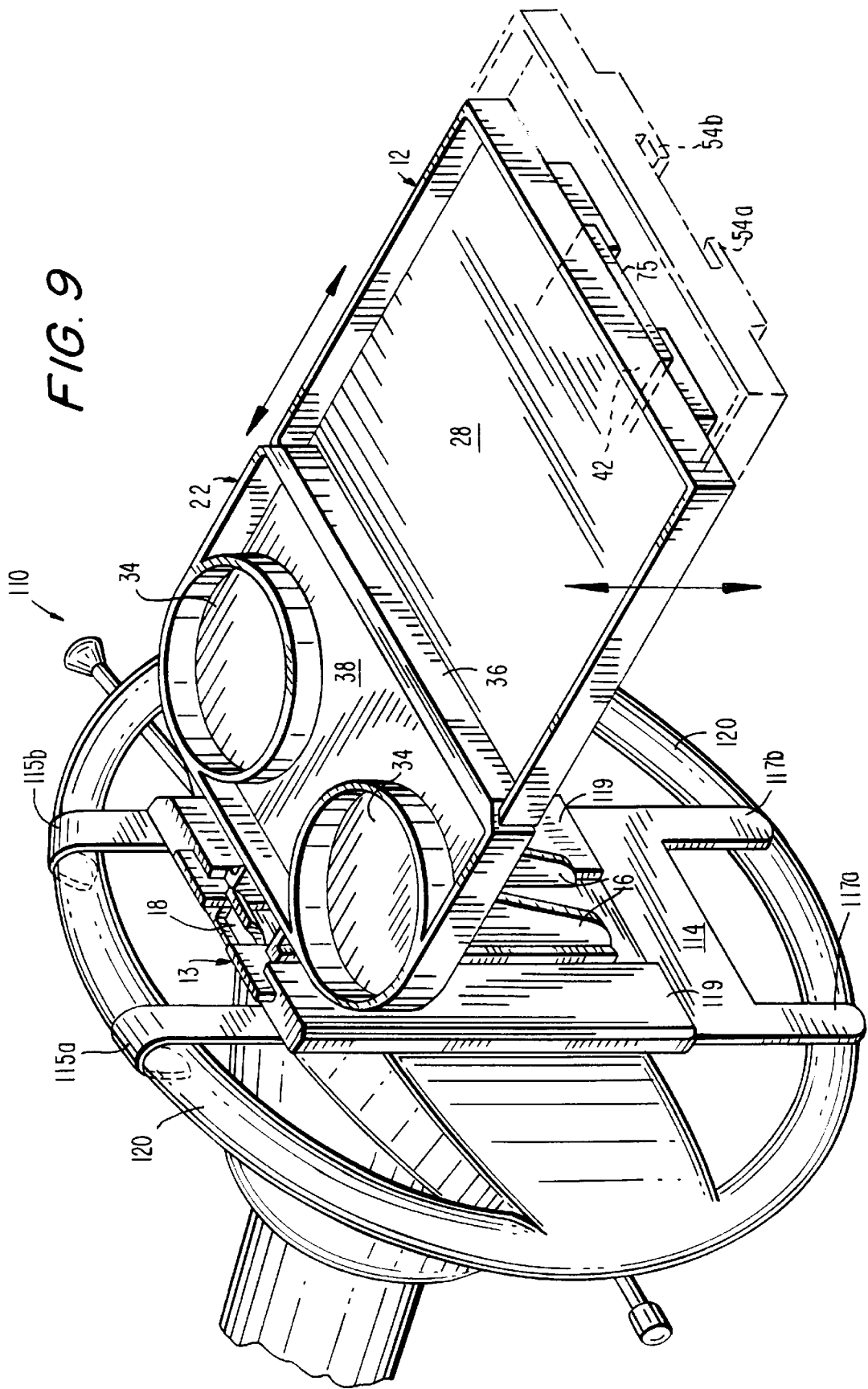

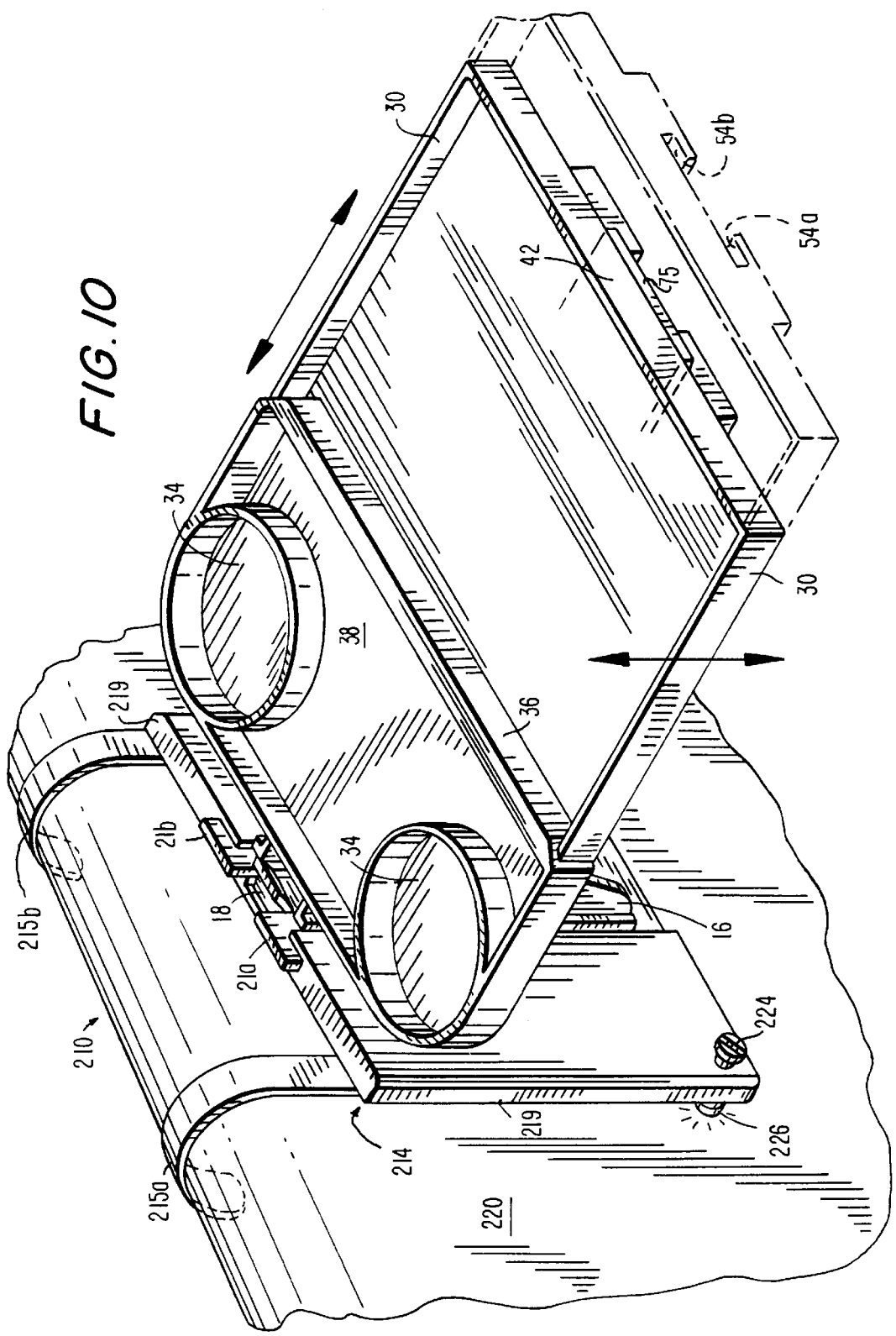

REMOVABLE TRAY ASSEMBLY FOR A VEHICLE

BACKGROUND OF THE INVENTION

1. Field of the Invention

The invention relates to tray tables and tray table structures. More particularly, the invention relates to a tray table which can be adjustably mounted on a portion of a vehicle for supporting various objects within the vehicle.

2. State of the Art

Tray tables for use on or within a vehicle are well known in the art. U.S. Pat. No. 2,921,824 to Richter discloses one tray table design which mounts on a seat within a vehicle and is collapsible. While the Richter table may be effective in use, it requires careful construction, is somewhat limited to vehicle seats having specific shapes and dimensions, requires the assembly of various moving parts, and is somewhat inconvenient to use. Moreover, although the pitch of the tray table is adjustable to maintain the top of the table in a generally lateral configuration with respect to the vehicle seats, the height of the tray table is not readily adjustable and may not be particularly suited for use with certain vehicles or certain consumers, e.g., small children.

Other known tray table designs which are specifically intended for use with a vehicle include my previous design, U.S. Pat. No. 5,511,493 which solves many of the problems noted in the prior art and provides for a vehicle mountable tray table which is securable to a door or seat of a vehicle by way of a pair of mounting brackets. My previous design also includes a dual stanchion adjustment assembly which permits the height of the tray table to be adjusted relative to the brackets.

More particularly, my previous design provides for a vehicle mountable tray table which has a pair of spaced-apart arcuate mounting brackets which releasably couple to a vehicle and an adjustment mechanism which has a pair of vertical stanchions which each extend along one of the brackets. The tray table is coupled to a pair of support arms which each slideably mount to one of the stanchions to allow for vertical adjustment of the tray table with respect to the mounting brackets. A pair of knobs operate to lock the support arms at a desired position along each of the stanchions.

While the structures taught in my previous design provide many important advantages, the present application affords several important improvements.

SUMMARY OF THE INVENTION

Accordingly, it is an object of the present invention to provide a new and improved removable tray table assembly which is inexpensive to manufacture, simple to use and which is easily adaptable and adjustable for mounting on a vehicle, e.g., doors, windows, steering wheels, seats and the like.

It is another object of the present invention to provide a novel vehicle tray table which has one or more releasable trays which are interchangeable with the tray table assembly.

It is another object of the present invention to provide a novel tray table which can be releasably locked at a desired height in an easy and facile manner.

It is a more particular object of the invention to provide a novel removable tray table assembly which can be readily and easily adjusted and locked to a desired height via a single-slide releasable locking mechanism to accommodate for the different sizes of vehicle occupants.

Certain of the foregoing and related objects are readily attained according to the present invention by the provision of a removable tray assembly for a vehicle which comprises a tray, a mounting bracket having a mechanism for removably supporting the bracket on a vehicle, a single-slide mechanism for slideably supporting the tray on the mounting bracket, and a mechanism for releasably locking the tray on the mounting bracket. Preferably, the mechanism for removably supporting the bracket on the vehicle comprises hook-like members which mount atop the vehicle.

Advantageously, the single-slide locking mechanism for slideably supporting the tray comprises a mounting bracket having a generally upright side plate and a generally upright tray support plate slideably coupled together to allow for vertical displacement of the plates relative to one another. Preferably, one of the plates comprises a vertically elongated channel and the other of the plates is slideably received in the channel. Most desirably, the side plate comprises a pair of spaced-apart, vertically-extending L-shaped flanges which each forms an elongated channel within the side plate and which conjointly form an elongated slot for receiving the tray support plate.

Advantageously, the releasable locking mechanism comprises a resilient tongue-like pawl and slotted rack, one of which is mounted on the side plate and the other of which is mounted on the tray support plate. Preferably, the pawl moves between an unlocked position wherein the tray support plate is freely slideable within the mounting bracket and a locked position wherein the tray support plate is locked at a desired vertical position. Most desirably, the slotted rack comprises a multiplicity of apertures disposed in the side plate in a vertical ladder-like manner and the pawl moves in vertical alignment with the slotted rack for resilient and releasable engagement with the apertures.

Preferably, the tray support plate slideably engages the tray. Desirably, the tray comprises a pair of opposing brackets which are mounted in parallel fashion to the underside of the tray. Each of the brackets comprises an inner periphery having a flange-receiving step such that the two opposing flange-receiving steps form a groove therebetween which slideably receives at least a portion of the tray support plate.

In one particular preferred embodiment, the vehicle tray comprises at least one additional tray which is removably mounted to the tray assembly. Most desirably, the additional tray comprises a beverage (cup, can, bottle, etc.) holder(s).

Preferably, the tray assembly also comprises a mechanism for maintaining the tray in a generally laterally disposed position when the mounting bracket is mounted onto the vehicle. In one particular embodiment, a screw adjustment mechanism, e.g., a screw and nut assembly, is affixed proximate the lower end of the side plate of the mounting bracket such that the nut projects a distance from the side plate between the side plate and the vehicle. By turning the screw, the vertical disposition of the side plate is adjusted which, in turn, adjusts the lateral disposition of the tray.

Additional objects and advantages of the invention will become apparent to those skilled in the art upon reference to the detailed description taken in conjunction with the drawings.

BRIEF DESCRIPTION OF THE DRAWINGS

Other objects and features of the present invention will become apparent from the following detailed description considered in connection with the accompanied drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 6 is an enlarged, sectional view taken along line 6—6 of FIG. 1;

FIG. 7 is an enlarged, fragmentarily-illustrated, sectional view taken along line 7—7 of FIG. 6;

FIG. 9 is a top, side and front perspective view of another embodiment of a tray table embodying the present invention mounted atop the steering wheel of a vehicle;

FIG. 10 is a top, side and front perspective view of another embodiment of a tray table embodying the present invention mounted atop a seat of a vehicle;

DETAILED DESCRIPTION OF THE PREFERRED EMBODIMENTS

Figure 1:
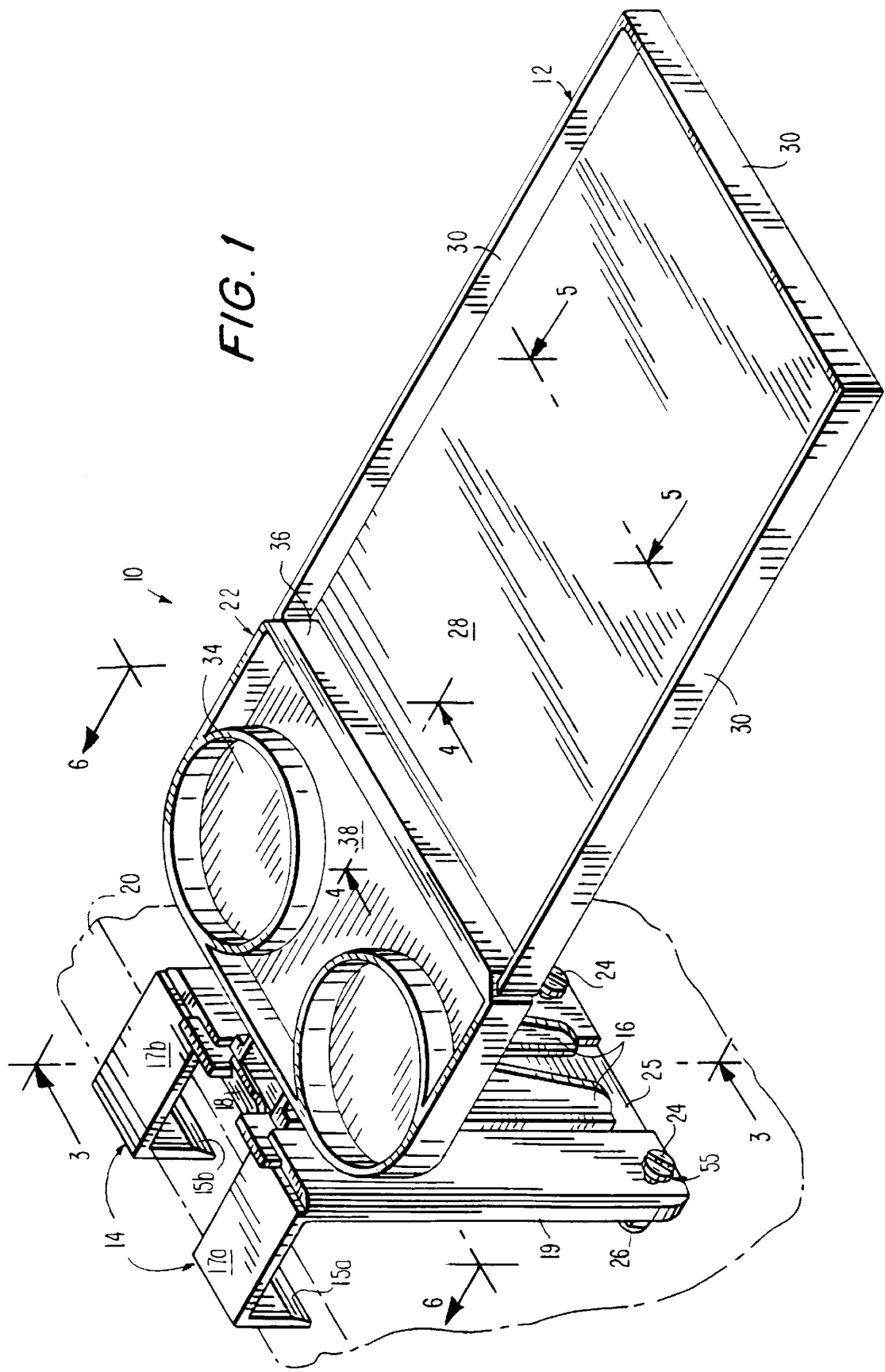
FIG. 1 is a top, side and front perspective view of a removable tray assembly according to the invention mounted atop a vehicle window (shown in phantom)
Figure 2:
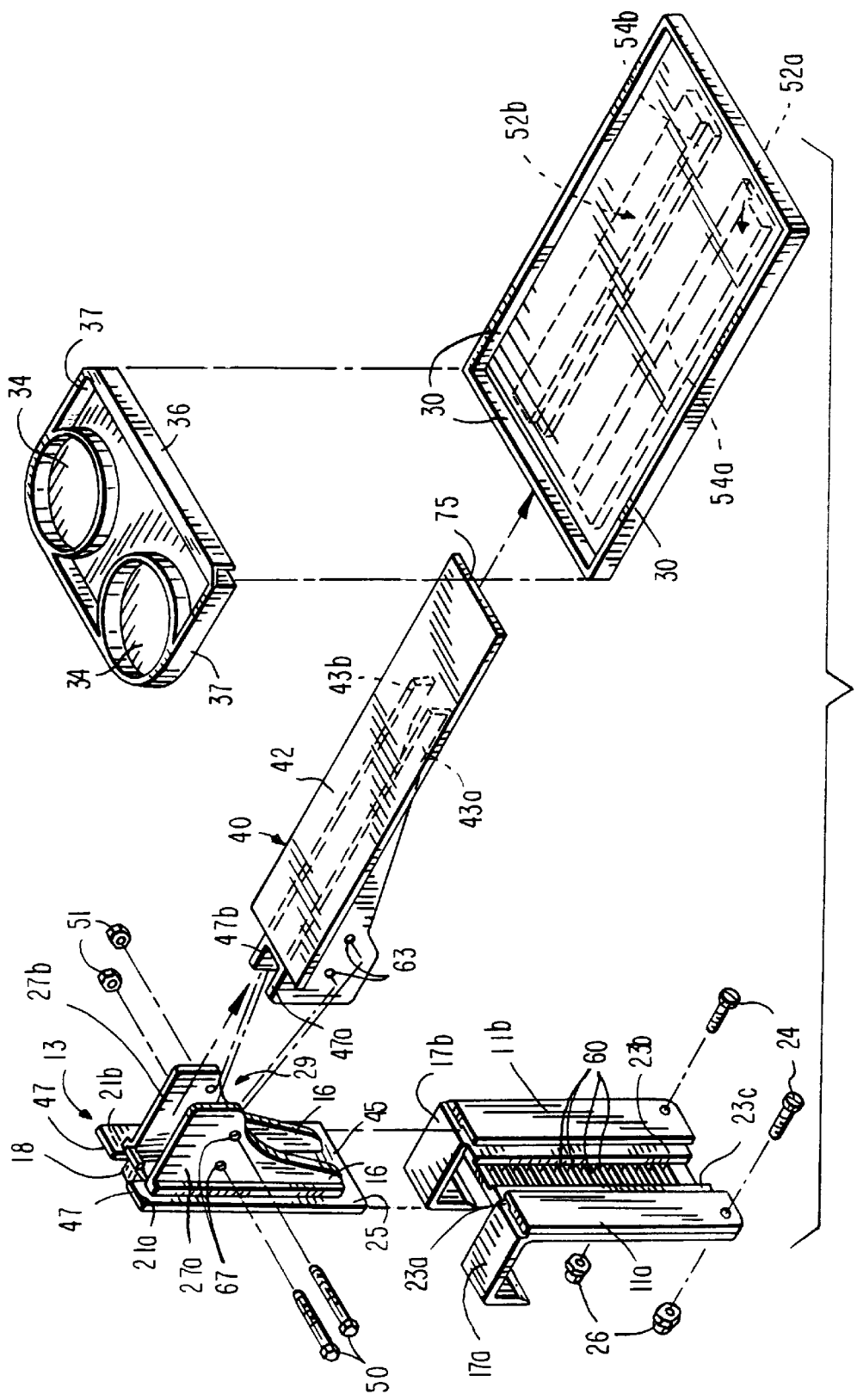
FIG. 2 is an exploded, top, side and front perspective view of the table illustrated in FIG. 1.

Referring now to the drawings, and in particular FIGS. 1 and 2 thereof, therein illustrated is a removable tray table assembly according to the present invention generally designated by reference numeral 10. Tray assembly 10 includes a generally rectangular platform or tray 12 used for supporting various objects such as sandwiches, drinks, games and the like. Tray 12 comprises a generally flat panel 28 and may have a peripherally extending raised edge or lip 30. In some cases, however, it may be desirable to construct tray 12 without any raised edges or lips depending upon the particular preference of the consumer or to support certain objects. Tray assembly 10 further includes a mounting bracket 14 which has a generally inverted J-shaped cross section which is releasably mountable on at least one portion of the vehicle, e.g., a vehicle door 20, and a single-slide releasable locking mechanism 13 for adjusting the vertical position or height of the tray 12 relative to the mounting bracket 14.

Preferably, the mounting bracket 14 comprises a pair of hooks each composed of a generally horizontally-disposed rectangular arm or top plate 17a, 17b joined at one end to the top edge of a relatively long vertically extending rectangular side plate 19. A relatively short downwardly-extending flange 15a, 15b, is attached to each of the opposite lateral ends of each plate 17a, 17b. Each corresponding top plate, e.g., 17a, the side plate 19 and the flange, e.g., 15a, are configured and dimensioned so as to act like a "hook" to mount the assembly atop a portion of a vehicle, e.g., the vehicle door 20, the steering wheel and/or the seat back.

Figure 3:
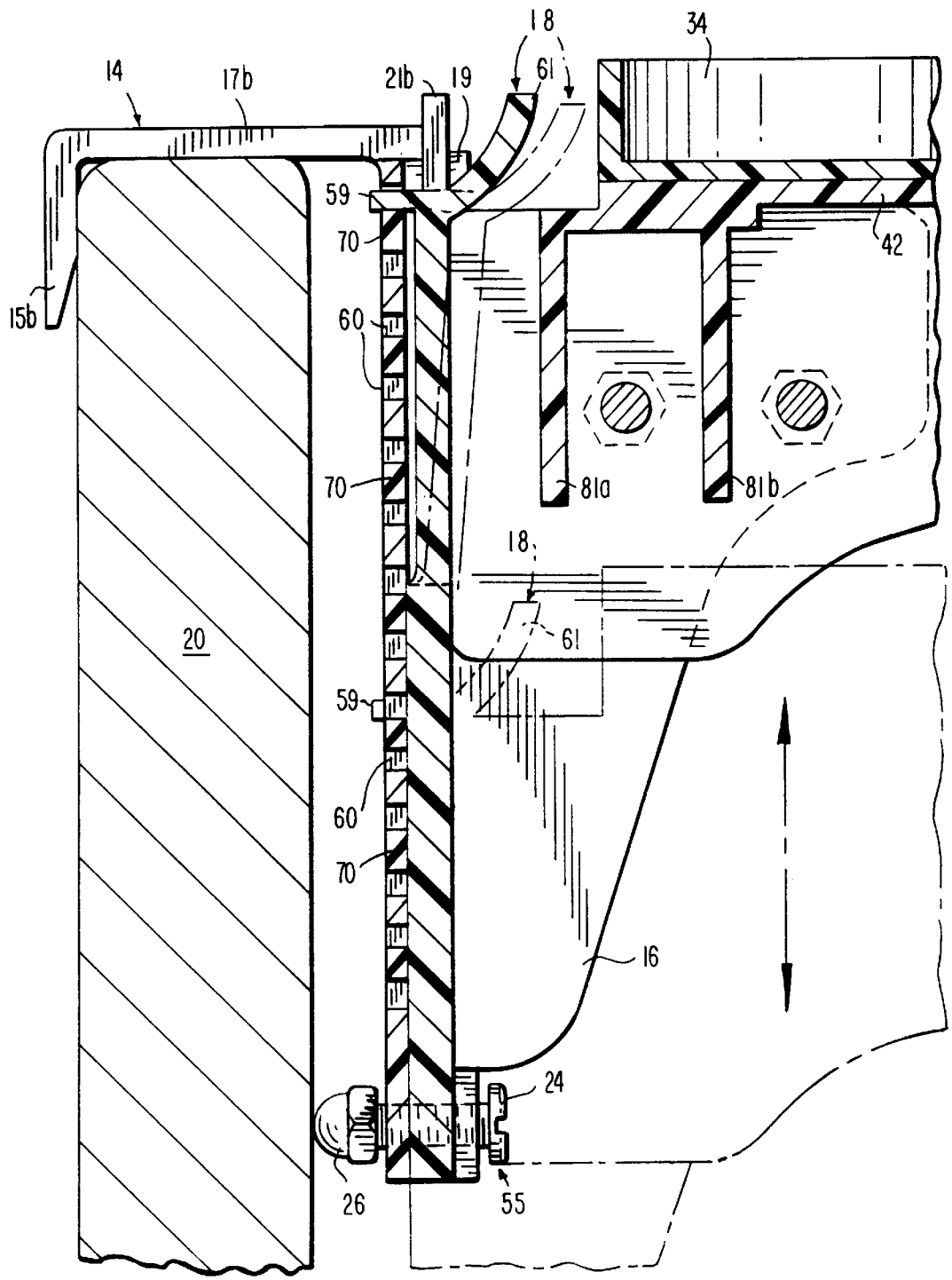
FIG. 3 is an enlarged, fragmentarily-illustrated, sectional view taken along line 3—3 of FIG. 1.

As seen in FIGS. 1, 3 and 7, mounting bracket 14 also comprises a screw adjustment mechanism 55 secured adjacent to the lower end of side plate 19 for maintaining the bracket 14 in an appropriate vertical position relative to the vehicle (or portion thereof), to, in turn, maintain the tray 12 in a proper horizontal position to avoid the spilling of its contents. Screw adjustment mechanism 55 comprises a rounded nut 26 and screw 24 which are assembled through a threaded hole in the mounting bracket 14 such that the rounded nut 26 projects from the side plate 19 and abuts the vehicle door 20. As can be appreciated, rotation of the screw 24 will cause the nut 26 to project a shorter or greater distance from the bracket side plate 19 to accommodate the dimensions of the vehicle door 20 or other part on which it is mounted to provide a stable and properly aligned base support for the tray 12.

As best seen in FIG. 2, side plate 19 has a pair of spaced-apart, vertically-extending generally L-shaped flanges 11a and 11b which each form a channel 23a and 23b, respectively. Advantageously, each channel 23a, 23b extends the majority of the length of side plate 19 such that both channels conjointly form a slot 23c for slideably receiving the single-slide releasable locking mechanism 13. Advantageously, side plate 19 also defines a centrally-located, vertically-extending slotted rack composed of a multiplicity of vertically spaced-apart, slots 60 (slots can be various shapes (circles, letters, squares, etc.) and rungs 70 which are arranged in a vertical ladder-like manner along the length of the same and which are generally located between L-shaped flanges 11a and 11b.

As best seen in FIG. 2, the single-slide mechanism 13 comprises a vertically-disposed tray support plate 25 having an upper end 47 and a lower end 45 and a pair of spaced-apart support braces 16 which support a cantilever support arm which, in turn, serves to support the tray. Preferably, the braces 16 are parallel to one another and project outwardly from plate 25. Most desirably, the braces 16 are tapered to provide added stability, i.e., the upper portions 27a and 27b of each of the braces 16 project a greater distance than the lower portions of the braces 16.

As seen in FIGS. 2 and 3, the upper half of the tray support plate 25 is slotted and of reduced thickness to define two outer guide tabs 21a and 21b and a centrally located resilient tongue-like pawl 18. Pawl 18 comprises an upper thumb member 61 and a detent 59 and is affixed at its lower end to plate 25. As best seen in FIGS. 3 and 7, the thumb member 61 projects away from the slide mechanism 13 in a generally upward and lateral direction such that access to the thumb member 61 is unhindered by any other part of the assembly 10 which, as can be appreciated, facilitates vertical adjustment of the tray 12. Detent 59 in its normal unbiased position projects into and beyond the rear of side plate 19 which facilitates locking of the slide mechanism 13 to the mounting bracket 14 as described in greater detail below.

According to the invention, the single-slide mechanism 13 is slideably coupled to the mounting bracket 14 such that the support plate 25 can freely slide in a vertical direction with respect to the mounting bracket 14. More particularly, the lower end 45 of plate 25 is slideably received within the upper end of the slot formed by channels 23a and 23b. As can be appreciated, flanges 11a and 11b are sufficiently dimensioned and spaced relative to one another so as to restrict lateral movement of the plate 25 within the slot 23c and permit only vertical movement of the plate 25 with respect to the mounting bracket 14.

Preferably, when the plate 25 is slideably coupled to mounting bracket 14, pawl 18 moves in vertical alignment with the slots 60 which are arranged in a ladder-like manner.

More particularly, since detent 59 is located proximate the upper end of the pawl 18, lateral movement of the thumb member 61 away from the mounting bracket 14 (see phantom representation FIG. 3) will result in the disengagement of the detent 59 from one of the slots 60 thus permitting free vertical movement of the slide mechanism 13 with respect to the mounting bracket 14. On the other hand, releasing the thumb member 61 will cause the detent 59 to spring back to its natural or unbiased position and engage one of the slots 60 between two adjacent rungs 70 and lock the plate 25 in position with respect to the mounting bracket 14.

As can be appreciated, the single-slide mechanism 13 allows for easy height adjustment of the tray 12 with single hand operation of the thumb member 61 of the pawl 18, i.e., the user with one finger simply manually moves the thumb member 61 back (away from the side plate 19) to disengage the detent 59, then vertically displaces the slide mechanism 13 to a desired vertical position (see arrow in FIG. 3) and simply manually releases the thumb member 61 to allow the detent 59 to lock into an opposing slot 70 in the rack thereby locking the slide mechanism 13 at a desired vertical position (see FIG. 3 shown in phantom). This, in turn, effectively raises or lowers the height of the tray 12 depending upon the particular preference of the vehicle occupant.

Preferably, braces 16 are disposed inwardly from the outer periphery of support plate 25 and spaced from one another accordingly so as not to impede vertical movement of the support plate 25. Most preferably, braces 16 are also disposed on support plate 25 such that the upper portion of each bracket 27a and 27b, respectively, projects from plate 25 on opposite sides of pawl 18 so as not impede access to the same.

As seen best in FIG. 2, a support arm 40 supports tray 12 and is affixed to the slide mechanism 13 preferably by way of a nut 51 and bolt 50 assembly. More particularly, the support arm 40 comprises a top, planar rectangular support wall 42 which has a generally flat front end 75 (or it can be rounded) and a pair of opposing support brackets 43a and 43b which are mounted in parallel fashion to the underside thereof such that the support brackets 43a and 43b extend along the majority of the underside of the support wall 42. In addition, a pair of cross braces 81a, 81b are provided between brackets 43a and 43b to provide additional strength and stability for the support arm 40. Preferably and as best seen in FIGS. 2 and 6, the rear end 47a and 47b of each support bracket 43a and 43b, respectively, extends beyond the support wall 42 opposite end 75. Advantageously, the support brackets 43a, 43b are generally tapered in a rearward direction so as to provide stability and strength for the support wall 42 when supporting the tray 12 and the tray contents. In some cases, it may be preferable to manufacture the front end 75 with a rounded or arcuate shape to facilitate slideable introduction of the support wall 42 within rails 52a and 52b.

Figure 8:
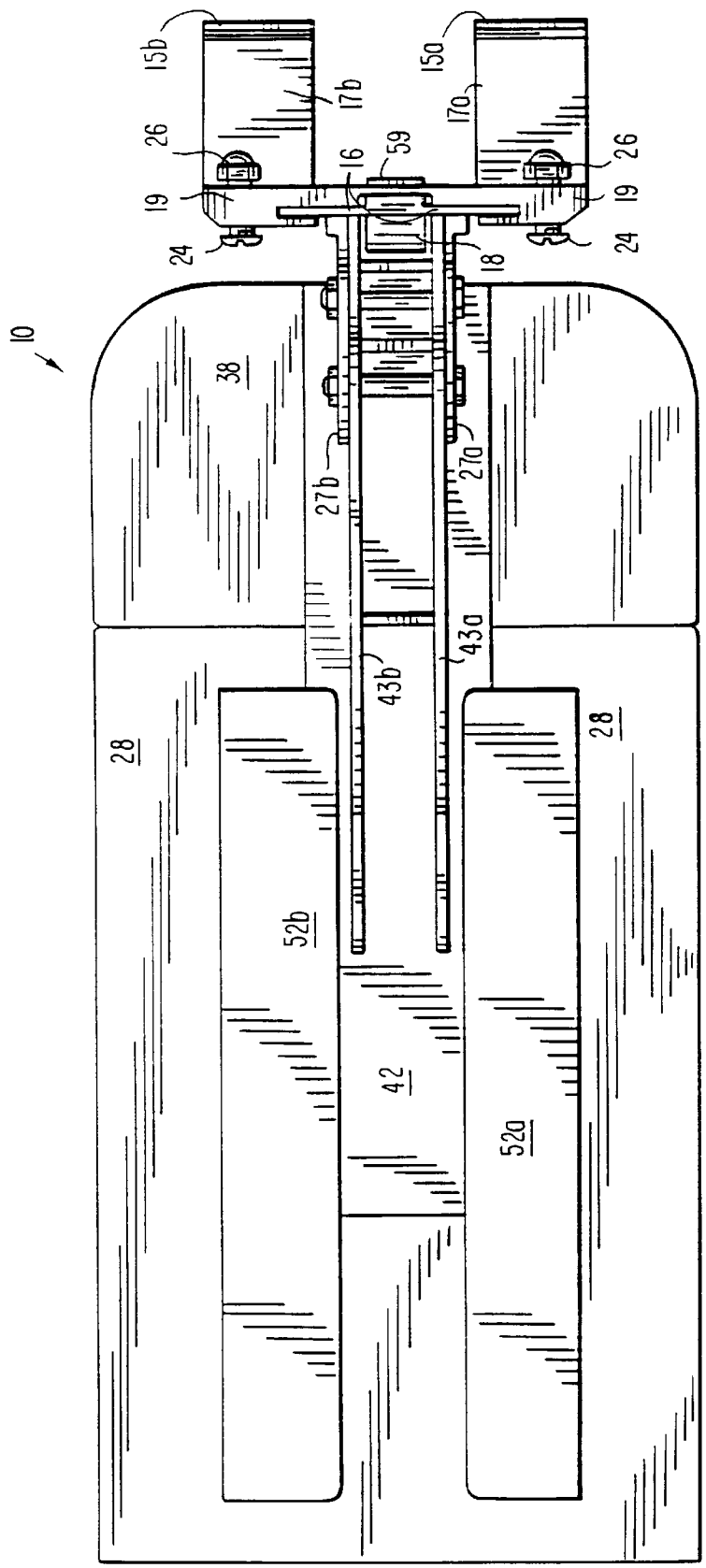
FIG. 8 is a bottom view of the tray table illustrated in FIG. 1.

Most desirably, the distance between the support brackets 43a, 43b is less than the distance between the upper portions 27a, 27b of the braces 16 such that rear ends 47a, 47b can be slideably received between upper portions 27a, 27b (see FIG. 6). Preferably, each support bracket 43a, 43b has a set of apertures 63 located therein which, when the support arm 40 is coupled to the slide mechanism 13, align with the apertures 67 of each brace 16. Once aligned, a pair of bolts 50 are inserted through each set of apertures 63, 67 and a pair of nuts 51 secure the support arm 40 to the slide mechanism 13 as best seen in FIG. 8.

As seen best in FIGS. 2, 5, 6 and 8, tray 12 slideably couples to the cantilevered support arm 40. More particularly, tray 12 comprises a pair of opposing rails 52a and 52b which are mounted to the underside of flat panel portion 28. Each rail 52a, 52b has an inner periphery comprising a flange-receiving step portion 54a and 54b, respectively, which conjointly form a groove or slot 80 (see FIG. 5) therebetween which is sufficiently dimensioned for receiving the end 75 of the support wall 42. Once the mounting bracket 14, slide mechanism 13 and support arm 40 are assembled and the tray assembly 10 is mounted on a vehicle 20, tray 12 by way of rails 52a, 52b can be easily slid into secure engagement with the support wall 42 (see FIG. 1).

Figure 4:
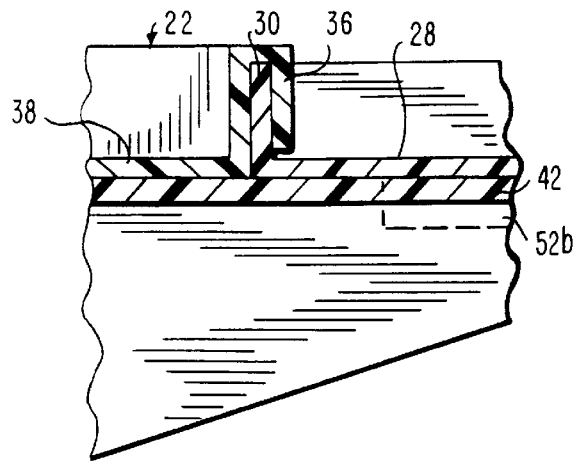
FIG. 4 is an enlarged, fragmentarily-illustrated, sectional view taken along line 4—4 of FIG. 1.
Figure 5:
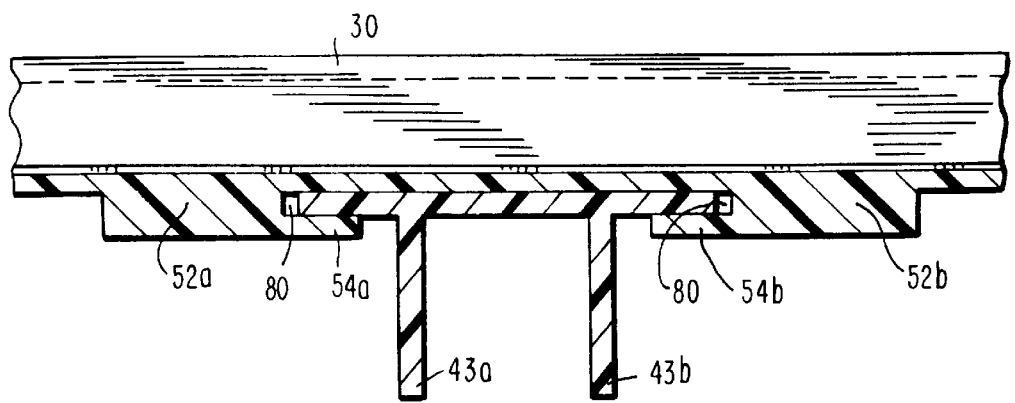
FIG. 5 is an enlarged, fragmentarily-illustrated, sectional view taken along line 5—5 of FIG. 1.

An additional or second tray 22 can be coupled to tray 12 in order to support additional objects, e.g., cups or drinks and silverware, condiments (packets of: sugar, salt, pepper, ketchup, etc.) More particularly, additional tray 22 includes a bottom plate 38 which has an upwardly extending rim or lip 37 which surrounds the outer periphery of the plate 38 and a pair of cup holders 34 which are each integrally formed with the rim 37. The additional tray 22 also includes a depending flange 36 which extends outwardly from the front of rim 37 and which is designed to releasably mount atop lip 30 of tray 12 as best shown in FIG. 4. Preferably, flange 36 frictionally engages lip 30 to prevent disengagement of the two trays 12, 22.

FIG. 9 shows another embodiment of the vehicle tray table 110 mounted atop a steering wheel 120. More particularly, the mounting bracket 114 in this embodiment includes two arcuate or C-shaped gripping hooks 115a and 115b which are attached to the upper end of the bracket 114 and which removably coupled over the top of the steering wheel 120. The side plate 119 of the bracket 114 includes two depending finger-like flanges 117a and 117b which extend downwardly from the bottom end of side plate 119. Preferably, the finger-like flanges are sufficiently dimensioned to extend beyond the opposite end of the steering wheel 20 which supports the gripping members 115a, 115b so as to maintain the bracket 114 in a generally vertically disposed position when mounted atop the wheel 120 which, in turn, maintains the tray 112 in laterally disposed position.

FIG. 10 shows yet another embodiment of the tray table 210 wherein the upper portion of the mounting bracket 214 comprises two arcuate or C-shaped gripping hooks 215a, 215b which are sufficiently dimensioned to releasably engage a vehicle seat back 220. In much the same manner as described with respect to the FIG. 1 embodiment, a screw 224 and nut 226 are assembled through an aperture in the depending side plate 219. As can be appreciated, turning the screw will adjust the vertical disposition of the mounting bracket 214 which, in turn, adjusts the lateral disposition of the tray 12 according to the particular preference of the consumer.

Figure 11:
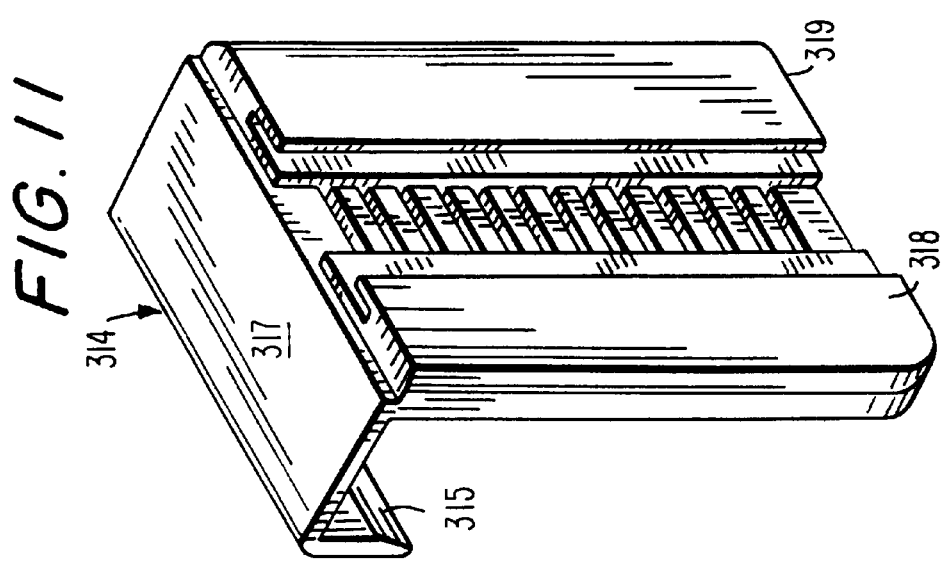
FIG. 11 is a top, side and front perspective view of an alternate embodiment of the mounting bracket.

FIG. 11 shows an alternate embodiment of the mounting bracket 314. In particular, mounting bracket 314 comprises a single horizontally disposed top plate 317 joined at one end to the top edge of the side plate 319 and joined at the opposite edge to a short downwardly-extending flange 315. As can be appreciated, this embodiment of the mounting bracket operates in a similar fashion to the earlier described embodiment.

Figure 12:
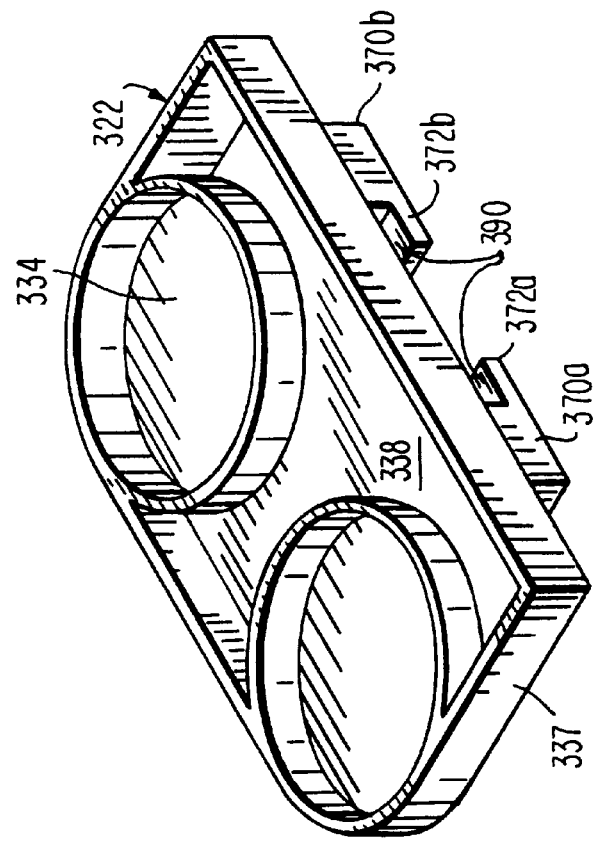
FIG. 12 is a top, side and front perspective view of an alternate embodiment of the additional tray.

FIG. 12 shows an alternate embodiment of the additional tray 322 which is removably coupled to tray 12 to support cups or drinks, silverware and condiments. More particularly, additional tray 322 includes a bottom plate 338 which has an upwardly extending rim or lip 337 which surrounds the outer periphery of the plate 338 and a pair of cup holders 334 which are each integrally formed with the rim 337. The additional tray 322 also includes a pair of opposing guide rails 370a, 370b which are mounted to the underside of plate 338. Each rail 370a, 370b has an inner periphery which includes a flange-receiving step portion 372a, 372b, respectively, which conjointly form a slot 390 therebetween for receiving a portion (not shown) of the tray 12. As can be appreciated, the additional tray 322 slideably couples to tray 12 by way of guide rails 370a, 370b and is used for supporting additional objects.

From the foregoing and with reference to the various figure drawings, those skilled in the art will appreciate that certain modifications can be made without departing from the scope of the present invention. For example, although the figure drawings depict tray 12 as a generally rectangular surface, other geometric shapes, e.g., circular, triangular and/or polygonal can be utilized to define the tray 12.

As mentioned above, the present invention is portable such that it can be easily transported and readily assembled where desired. However, in some cases it may be desirable to permanently secure the slide mechanism 13 and the support arm 40 so as to facilitate assembly of the tray table 10.

In some cases, it may be preferable to shape the mounting bracket 14 differently, e.g., U or L-shaped cross section such that it is more easily mounted upon a particular portion of a vehicle 20. In other cases it may be preferable to mount the tray assembly to the vehicle 20 in a different fashion, e.g., snap mechanism or synthetic hook and loop fastening strips that adhere when pressed together commonly sold under the trademark VELCRO®.

Moreover, in some cases, however, it may be desirable to affix the single-slide mechanism 13 to the support arm 40 in a different fashion, e.g., snap-fit. It may also be preferable to affix the tray table 12 to the support arm 40 in a different manner, e.g., VELCRO®, snap-fit, clamp, or pin-like assembly.

Although it is shown that the tray 12 and side plate 19 are generally rectangular in shape, in some cases it may be preferable to manufacture the tray 12 and/or side plate 19 in a different shape, e.g., circular, triangular, and/or arcuate. Moreover, it may be preferable to manufacture the tray 12 and/or the side plate 19 with an ornamental shape, e.g., Christmas tree, heart, shamrock, golf club, football, and/or fish. Still further, it may be preferable to engrave the tray 12 and/or the side plate 19 with letters or designs depending upon the particular preference of the consumer.

Although the pawl 18, detent 59 and the corresponding slots 60 have been generally described herein, it is important to note that the pawl 18, detent 59 and corresponding slots 60 can be manufactured in a variety of different shapes and still function in the same or similar manner as heretofore described. For example, the pawl 18 can be made in the form of a tennis ball, hockey stick, football, baseball bat, person, or holiday ornament without effecting the utilitarian aspects of the pawl 18 itself. Similarly, the detent and corresponding slots 60 can be shaped in a variety of different decorative forms and still not depart from their intended purpose, i.e., to releasably lock the plate 25 in a desired vertical position with respect to the mounting bracket 14.

Moreover, although it is has been shown that the screw adjustment mechanism 55 comprises a screw 24 and nut 26 assembly, it is possible to substitute a bolt with a large turning knob in lieu of the screw 24 to simplify vertical adjustment of the mounting bracket. Nut, knot head and bolt head can also be various shapes.

There have been described and illustrated herein several embodiments of a removable tray assembly. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A removable tray assembly for a vehicle, comprising:

a tray;

a mounting bracket having means for removably supporting said bracket on a vehicle;

single slide means for slideably supporting said tray on said mounting bracket, said single slide means for slideably supporting said tray comprising a mounting bracket having a generally upright side plate and a generally upright tray support plate slideably coupled together to allow for vertical displacement of said plates relative to one another; and means for releasably locking said tray on said mounting bracket.

2. A removable tray assembly according to claim 1, wherein said means for removably supporting said mounting bracket are hook-like means.

3. A removable tray assembly according to claim 1, wherein said means for removably supporting said mounting bracket comprises a top plate and a side plate which depends from a peripheral edge of said top plate, said top plate and said side plate having a generally inverted J-shaped cross section.

4. A removable tray assembly according to claim 1, wherein said means for removably supporting said mounting bracket comprises a top plate and a side plate which depends from a peripheral edge of said top plate, said top plate and said side plate having a generally inverted C-shaped cross section.

5. A removable tray assembly according to claim 1, wherein one of said plates comprises a vertically elongated channel and the other of said plates is slideably received in said channel.

6. A removable tray assembly according to claim 1, wherein said side plate comprises a vertically elongated channel and said tray support plate is slideably received in said channel.

7. A removable tray assembly according to claim 1, wherein said side plate comprises a pair of spaced-apart, vertically-extending L-shaped flanges which each forms an elongated channel within said side plate and which both conjointly form an elongated slot for receiving said tray support plate.

8. A removable tray assembly according to claim 1, wherein said means for releasably locking said tray comprises:

a resilient tongue-like pawl and slotted rack one of which is mounted on said side plate and the other of which is mounted on said tray support plate; and wherein said pawl is moveable between an unlocked position, in which said tray support plate is freely slideable within said mounting bracket, and a locked position, in which said tray support plate is locked at a desired vertical position.

9. A removable tray assembly according to claim 8, wherein said pawl is resiliently affixed to said tray support plate and said slotted rack is disposed within said side plate.

10. A removable tray assembly according to claim 9, wherein said slotted rack comprises a multiplicity of apertures which are disposed in said side plate in a vertical ladder-like manner and said pawl moves in vertical alignment with said slotted rack for resilient and releasable engagement with said apertures.

11. A removable tray assembly according to claim 1, wherein said tray support plate slideably engages with said tray.

12. A removable tray assembly according to claim 1, wherein said tray further comprises:
- a pair of opposing brackets mounted in parallel fashion to the underside of said tray, each of said brackets having an inner periphery comprising a flange-receiving step such that the two opposing flange-receiving steps form a groove therebetween;
- a support arm which is affixed to said tray support plate and which is slideably receivable with said groove of said tray.

13. A removable tray assembly according to claim 12, further comprising at least one additional tray which comprises a pair of opposing rails which cooperatively define a slot in which said support arm is slideably received.

14. A removable tray assembly according to claim 1, further comprising at least one additional tray including means for removably mounting said additional tray on said tray.

15. A removable tray assembly according to claim 14, wherein said additional tray comprises a cup or beverage holder.

16. A removable tray assembly according to claim 1, further comprising means for maintaining said tray in a general laterally disposed position when said mounting bracket is mounted on said vehicle.

17. A removable tray assembly according to claim 16, wherein said mounting bracket has a threaded bore and said maintaining means comprises a screw received in said bore which is engageable with said vehicle to adjust the position of the bracket and, in turn, the tray, relative thereto.

18. A removable tray assembly according to claim 1 wherein said means for removably supporting said mounting bracket comprise 1 or more hook-like members.

19. A removable tray assembly for a vehicle, comprising:
- a tray;
- a mounting bracket having means for removably supporting said bracket on a vehicle, said mounting bracket has a threaded bore and said maintaining means comprises a screw received in said bore which is engageable with said vehicle to adjust the position of the bracket and, in turn, the tray, relative thereto;
- single slide means for slideably supporting said tray on said mounting bracket;
- means for releasably locking said tray on said mounting bracket; and
- means for maintaining said tray in a generally laterally disposed position when said mounting bracket is mounted on said vehicle.

* * * * *